UNITED STATES PATENT OFFICE.

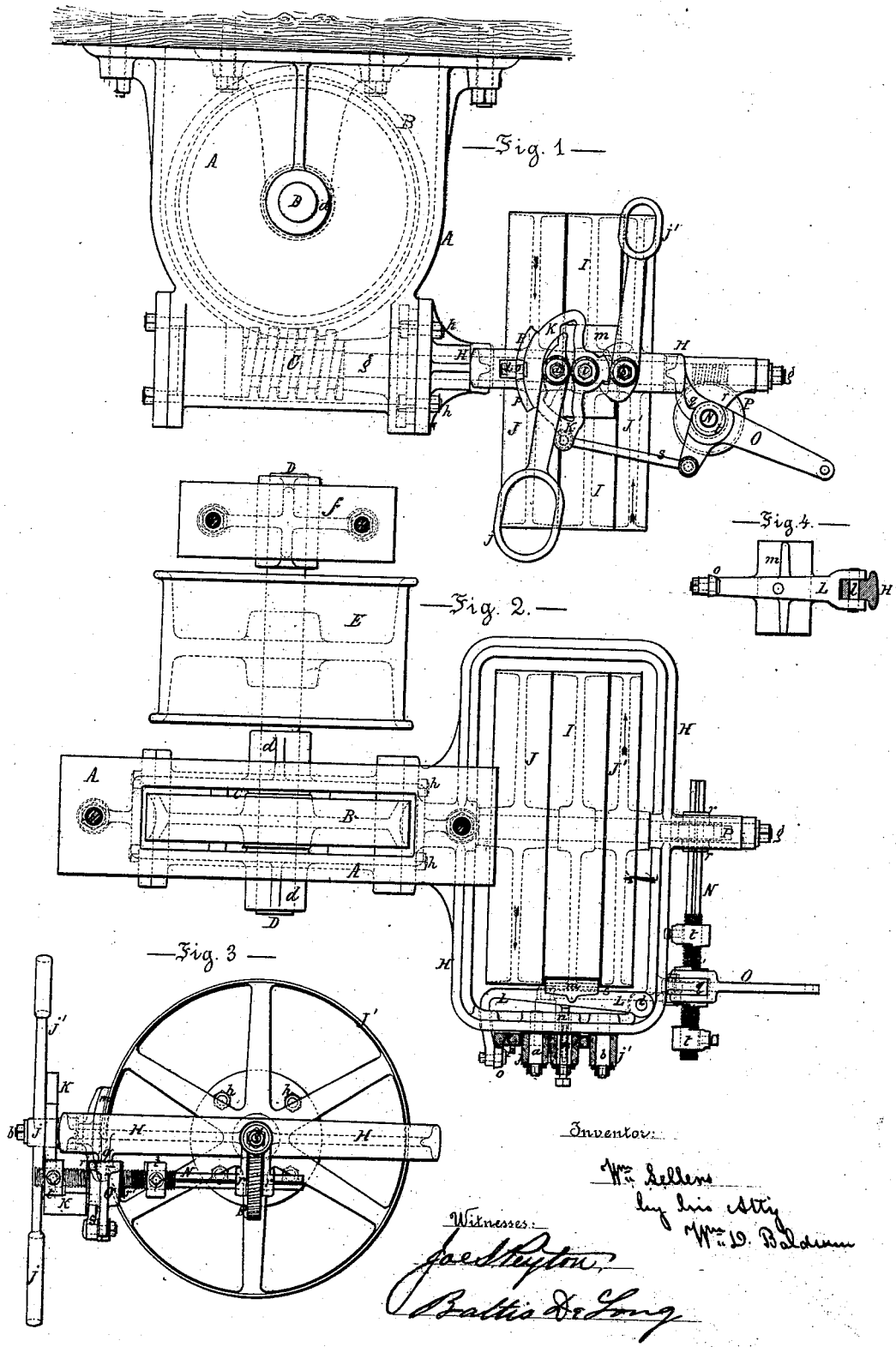

WILLIAM SELLERS, OF PHILADELPHIA, PENNSYLVANIA.

IMPROVEMENT IN HOISTING-MACHINES.

Specification forming part of Letters Patent No. 112,856, dated March 21, 1871.

*To all whom it may concern:*

Be it known that I, WILLIAM SELLERS, of the city and county of Philadelphia, in the State of Pennsylvania, have invented certain Improvements in Hoisting Machinery, of which the following is a specification:

My invention relates to that class of hoisting-machines to which the power from a line-shaft or counter-shaft is transmitted by means of an open and a crossed belt in alternately-opposite directions.

A device for shifting two belts moving in different directions or at different velocities, which was patented to me December 16, 1862, is especially adapted to this class of hoisting-machines; and the object of the first part of my present invention is to combine with my said belt-shifting device a brake attachment, to arrest the motion of the drawing-pulley at the instant of shifting both belts on their respective loose pulleys. This brake serves the double purpose of arresting the motion at a precise point as soon as the driving power ceases to act and of preventing the load from running down by gravitation by preventing the machine from turning in the direction incident to the suspended load.

It is the object of the second part of my invention to apply to this combined belt-shifter and brake an improved mechanism for automatically arresting its motion at certain points in either direction, which points can be readily altered and so adjusted relatively as to vary the height of lift, while the same mechanism may be used to arrest or reverse the motion of the machine by hand at any point within the limits of their automatic adjustment.

It is the object of the third part of my invention to make the combined belt-shifters, brake, and stop mechanism adjustable radially about the axis of the pulley-shaft, so that the machine may be placed in any position best suited to a given locality, and that in whatever position it is placed the driving-belts may be conducted to it at any angle without the need of alteration or special arrangement of any part of the machine in order to adapt it to any special position of the driving-shaft.

In the accompanying drawing, Figure 1 is a side elevation of a hoisting-machine containing my improvements. Fig. 2 is a plan of the same, partly in section, and with the belt-shifting mechanism turned on the shaft into a position the opposite of that shown in Fig. 1. Fig. 3 is an end view of part of the machine. Fig. 4 is a view of the brake detached.

The drawing represents my improvements embodied in a hoisting-machine in which a worm and worm-wheel are the only gearing for transmitting the belt power from the pulley-shaft to the drum-shaft. The worm-wheel B, worm C, and the bearings $d\ d$ of the drum-shaft D are all contained in the casing A, which also forms the main support of the machine. The hoisting-drum E is mounted on the shaft D, the outer end of which rests in a bearing, $f$. The worm-shaft $g$ has its bearings in a frame, H, which is secured to the casing A by bolts $h\ h$. The heads of these bolts are confined in an annular groove in the end of the casing A, so as to admit of their turning with the shaft, and allowing an unrestricted adjustment of the frame H about the axis of shaft $g$. The driving-pulley I is fast on the shaft $g$, between the two loose pulleys J J' mounted on the same shaft. The wider, J, of the loose pulleys carries the forward driving or hoisting belt, and the narrow pulley, J', the narrower lowering-belt.

The device for shifting the belts, heretofore patented by me, consists of a peculiarly-shaped lever, K, vibrating upon a fulcrum-pin, $i$, placed between the fulcrum-pins $a$ and $b$ of the two belt-shifters $j$ and $j'$, all being supported on the frame H. The middle lever K is provided on opposite sides with an internal or external projection or tooth, gearing respectively with a corresponding notch and projection on the respective shifters.

The teeth upon the middle lever are relatively so disposed that the motion of one shifter is effected and completed before that of the other is commenced, which arrangement combines, with the least possible lateral motion of the belt in shifting, the important advantage of entirely removing one belt from the driving-pulley before the other commences to take hold to reverse its motion. The shifting is thus effected with very little power, and the undue straining of the belts avoided.

The brake for arresting the motion of the pulley-shaft simultaneously with the shifting of both belts on their respective loose pulleys consists of a lever, L, which has its fulcrum at $l$ in the frame H, Fig. 4, and is provided with a friction-pad, m, of suitable width and curve to fit the rim of the driving-pulley I. This brake-pad is actuated by a spiral spring, n, Fig. 2, and by a belt-shifter cam, K, in the following manner: A curved extension of the arm L, which passes through an opening from within to the outside of frame H, is provided with a friction-roller, o, placed relatively to a cam-shaped projection, p, on the cam K, as best seen in Fig. 2. This projection forms two inclines, highest at the ends and converging to the lowest point in the middle. Now, the roller o on the brake is so arranged relatively to these inclines that, while the cam K and belt-shifters are in the position shown in Fig. 1, with both belts off the fast pulley, the lowest point of projection, p, being then under the roller o, the friction-pad is allowed to bear on the rim of the pulley I, against which it is pressed by the spring-bolt n' bearing upon the back of the arm L, as shown in Fig. 2. Any motion of the cam K in either direction, for leading one belt or the other on the fast pulley, causes its respective incline or projection p to raise the lever L, and thus lift the friction-pad from the rim of the pulley I simultaneously with the lateral approach of the shifted belt.

The mechanism applied to make the machine automatic in arresting its motion at fixed points in either direction and to adjust these points to vary the height or range of lift is arranged as follows: The shaft g has within its outer bearing a screw-thread cut upon it, acting as a worm to a worm-wheel, P, which is feathered to a short shaft, N, having its axis at right angles to the pulley-shaft, and suspended in bearings q and r on the frame H. A positive slow motion in either direction is thus imparted to the shaft N from the pulley-shaft g. The shaft N has a thread cut upon it over that portion of its length which passes through the bearing q, the forked hub of a bell-crank, O, acting as a nut for this thread. The manner in which the hub of this bell-crank is forked over the bearing q prevents any motion of the lever O in the direction of the axis of the screw. At both ends of the hub of the crank O are clutch-projections r' r', matching with adjustable clutches t t placed on opposite ends of the screw-thread on the shaft N.

The number of available threads on this screw exceeds the number of revolutions the shaft N will have to make for the greatest required range of hoist and the distance between the two adjustable clutches t t determines the exact height of hoist and its limits at both ends, as the projections on the hub of the bell-crank O will be alternately brought in contact with the clutch-stop at either end, and thus give a part of a turn to the bell-crank O, which, by means of a link-connection, S, imparts the required motion to the belt-shifter. With the aid of any suitable connection to the long arm of bell-crank O, the belt-shifter and brake may be controlled and operated by hand at any point between the end and limits of motion.

All the parts appertaining to the belt-shifter motion, brake, and stop mechanism being supported on the frame H, this frame may be turned into any position about the axis of the pulley-shaft without disturbing the relative conditions of any of those parts. This radial adjustment of frame H serves an important object by allowing the machine to be placed in any position to suit space and locality, as the belt-shifters will thus permit the driving-belts to be conducted to the machine at any angle due to the relative position of the driving-shaft.

Having thus described the nature and objects of my improvements, what I claim as my invention, and desire to secure by Letters Patent, is—

1. The combination, with the brake-lever L, of the belt-shifter cam K, actuating the lever in the manner and for the purpose specified.

2. The combination of the belt-shifters, the brake, the geared clutch-shaft N, adjustable stops r r, and bell-crank O, the combination being and operating in the manner and for the purposes set forth.

3. The combination, with a hoist, of a swing-frame, H, as and for the purpose described.

In testimony whereof I have hereunto subscribed my name.

WM. SELLERS.

Witnesses:
CYRUS BORGNER,
H. A. FULTON.